United States Patent
Lee et al.

(10) Patent No.: US 10,686,911 B2
(45) Date of Patent: *Jun. 16, 2020

(54) METHOD AND SYSTEM FOR MOBILE APPLICATIONS UPDATE IN THE CLOUD

(71) Applicant: International Business Machines Corporation, Armonk, NY (US)

(72) Inventors: Tien Hiong Lee, Singapore (SG); Konstantin Levinski, Singapore (SG); Chee Meng Low, Singapore (SG); Weng Sing Tang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,135

(22) Filed: Oct. 15, 2018

(65) Prior Publication Data

US 2019/0052732 A1  Feb. 14, 2019

Related U.S. Application Data

(63) Continuation of application No. 15/485,988, filed on Apr. 12, 2017, now Pat. No. 10,432,752.

(51) Int. Cl.
*H04L 29/08* (2006.01)
*G06F 8/65* (2018.01)
(Continued)

(52) U.S. Cl.
CPC ............. *H04L 67/34* (2013.01); *G06F 8/65* (2013.01); *G06F 9/455* (2013.01); *G06F 11/3668* (2013.01); *H04L 67/1095* (2013.01)

(58) Field of Classification Search
USPC ....... 709/219, 220, 201, 224, 225, 223, 229, 709/226
See application file for complete search history.

(56) References Cited

U.S. PATENT DOCUMENTS 9,176,648 B1  11/2015  Laporte et al.
9,176,759 B1  11/2015  Sahasranaman et al.
(Continued)

OTHER PUBLICATIONS

List of IBM Patents or Applications Treated as Related, Oct. 16, 2018.
(Continued)

*Primary Examiner* — Jude Jean Gilles
(74) *Attorney, Agent, or Firm* — Terrile, Cannatti & Chambers, LLP; Michael Rocco Cannatti

(57) ABSTRACT

A method, system and a computer program product are provided for updating mobile device applications at a central cloud server by establishing an application virtual machine representation of a first mobile device application installed on a mobile device; updating the application virtual machine representation at the central cloud server to perform software configuration, installation, upgrade, optimization, testing, or maintenance tasks on the application virtual machine representation without using computational resources at the mobile device; and sending the mobile device one or more modules that were changed when updating the application virtual machine representation for integration into the first mobile device application installed on the mobile device.

9 Claims, 5 Drawing Sheets

(51) Int. Cl.
*G06F 9/455* (2018.01)
*G06F 11/36* (2006.01)

(56) References Cited

U.S. PATENT DOCUMENTS

| | | | |
|---|---|---|---|
| 9,311,071 B2 | 4/2016 | Tan et al. | |
| 9,317,689 B2 | 4/2016 | Aissi | |
| 10,026,076 B2 | 7/2018 | Kumar et al. | |
| 10,432,752 B2 * | 10/2019 | Lee | H04L 67/1095 |
| 2008/0177638 A1 | 7/2008 | Butler | |
| 2008/0184216 A1 | 7/2008 | Muedsam | |
| 2011/0022861 A1 * | 1/2011 | Agneeswaran | G06F 1/3203 |
| | | | 713/310 |
| 2011/0029672 A1 * | 2/2011 | Agneeswaran | G06F 9/5044 |
| | | | 709/226 |
| 2011/0209064 A1 | 8/2011 | Jorgensen et al. | |
| 2013/0088577 A1 | 4/2013 | Hakkarainen et al. | |
| 2013/0204906 A1 * | 8/2013 | Ko | G06F 16/972 |
| | | | 707/803 |
| 2014/0019480 A1 * | 1/2014 | Rychikhin | G06F 8/30 |
| | | | 707/770 |
| 2014/0025424 A1 * | 1/2014 | Juillard | G06F 16/972 |
| | | | 705/7.26 |
| 2014/0179313 A1 | 6/2014 | Orton et al. | |
| 2014/0201366 A1 | 7/2014 | Kamp | |
| 2014/0310709 A1 | 10/2014 | Nirantar | |
| 2015/0081764 A1 | 3/2015 | Zhao et al. | |
| 2016/0057619 A1 * | 2/2016 | Lopez | G06Q 20/382 |
| | | | 380/247 |
| 2016/0205085 A1 | 7/2016 | Tang | |
| 2016/0266885 A1 | 9/2016 | Aleksandrov et al. | |
| 2016/0283854 A1 | 9/2016 | Lee et al. | |
| 2016/0323384 A1 * | 11/2016 | Lei | G06F 3/067 |
| 2017/0061904 A1 | 3/2017 | Lin et al. | |
| 2017/0149818 A1 | 5/2017 | Hillis et al. | |
| 2017/0150353 A1 | 5/2017 | Hillis et al. | |
| 2017/0169662 A1 | 6/2017 | Froy et al. | |
| 2017/0243009 A1 * | 8/2017 | Sejpal | G06F 21/577 |
| 2018/0210808 A1 * | 7/2018 | Shanmugam | H04L 41/5067 |
| 2018/0302495 A1 | 10/2018 | Lee et al. | |

OTHER PUBLICATIONS

Chien-Hung Liu et al., Abstract from "Improving Resource Utilization of a Cloud-Based Testing Platform for Android Applications," 2015 IEEE International Conference on Mobile Services, Jun. 27-Jul. 2, 2015.

Shih-Hao Hung et al., "Executing Mobile Applications on the Cloud: Framework and Issues, Computers and Mathematics with Applications," vol. 63, Issue 2, Jan. 2012, pp. 573-587.

* cited by examiner

— 1 —
METHOD AND SYSTEM FOR MOBILE APPLICATIONS UPDATE IN THE CLOUD

BACKGROUND OF THE INVENTION

Field of the Invention

The present application relates generally to an improved data processing apparatus and method. In one aspect, the present application relates to the performance of maintenance tasks, such as software installation, configuration, upgrade and/or backup, on memory-constrained devices.

Description of the Related Art

As mobile technology continues to grow exponentially into different types of devices, there are increasingly conflicts between the direction of mobile technology development and device design and manufacture. For example, as computing capacity and storage requirements for modern applications grow, there are also efforts to reduce or limit power consumption in order to extend battery life without sacrificing performance requirements. And as smaller device form-factors gain in popularity (e.g., with steady-growing wearable technology), there are additional design and performance constraints, not only with limits on storage and processing capabilities in the smaller devices, but also with reduced configurability when smaller devices are not easily configured due to limited size and space on the small devices for proper input/output interface controls. These constraints can adversely affect the ability of mobile devices to perform maintenance tasks since they consume significant computing resources, effectively introducing computing resource "dead weight" which is needed for maintenance and cannot be used for general application work.

While there are existing distribution platforms for mobile apps (e.g., the App Store from Apple Inc. or Google Play from Google) which use a centralized repository to install and/or update applications on memory-constrained mobile devices by automatically un-installing entire applications from a mobile device before re-installing the updated application back onto the device, such solutions are extremely inefficient in terms of required memory space, processing power, and data bandwidth required for the update operations. For example, when a repository maintains a cloned device state for the purpose of backup and transfer of information to a new device after purchase, any application maintenance by such a repository is performed on the mobile device, and even the backup service is focusing exclusively on saving\restoring existing application set, without any modifications. There are also security concerns with conventional repository-based procedures for installing or updating a mobile component since it is still possible to have security flaws in the installation process, even when the installation archives are downloaded from a verified location. Of course, these security concerns are exacerbated with mobile devices that do not receive significant updates. And while there are cloud-based virtual machines, such as the Xamarins Test Cloud, which may be used to perform UI acceptance testing of mobile applications in the cloud across different devices, such testing services provide no back-link to the mobile device.

With increasing usage of mobile devices, it is crucial to ensure that software glitches or incorrect operation does not render the device useless. The operative functionality of devices is generally determined by the manufacturer-installed applications which are stored in read-only memory to protect against inadvertent deletion or update by the device user, requiring that any update of read-only applications is performed by installing the newer copy of the application side-by-side with the original, write-protected one.

As seen from the foregoing, existing solutions for performing maintenance tasks on mobile devices with performance or design constraints are extremely difficult at a practical level in terms of securely and efficiently installing, configuring, upgrading and/or backing up applications on resource constrained mobile devices.

SUMMARY

Broadly speaking, selected embodiments of the present disclosure provide a cloud-based system, method, and apparatus for maintaining or updating software applications on memory-constrained devices by creating a virtual representation of a mobile device in a cloud-based application center which may be used to offload the software configuration, installation, upgrade and maintenance tasks, freeing up the limited resources of the mobile device for running the applications. To enable application update and maintenance in the cloud, a copy of the application's runtime environment from the mobile device is assembled in the cloud so that each application may run as an application virtual machine (VM) in its own isolated sandbox virtual machine. In selected embodiments, each application is constructed with a clearly defined structure and interfaces (e.g., to "data" and "input/output") that are optimized for efficient cloning of the application VMs from application center to the mobile device. In this way, applications are running within lightweight virtual machines based on sandbox contents, and any updates to the cloned application running in its own sandboxed virtual machine may be securely and efficiently updated by using a control module at the mobile device to perform updates of the virtual machines by communicating with the application center.

The foregoing is a summary that is provided to introduce a selection of concepts in a simplified form that are further described below and thus contains, by necessity, simplifications, generalizations, and omissions of detail; consequently, those skilled in the art will appreciate that the summary is illustrative only and is not intended to identify key factors or essential features of the claimed subject matter, nor is it intended to be used to limit the scope of the claimed subject matter. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
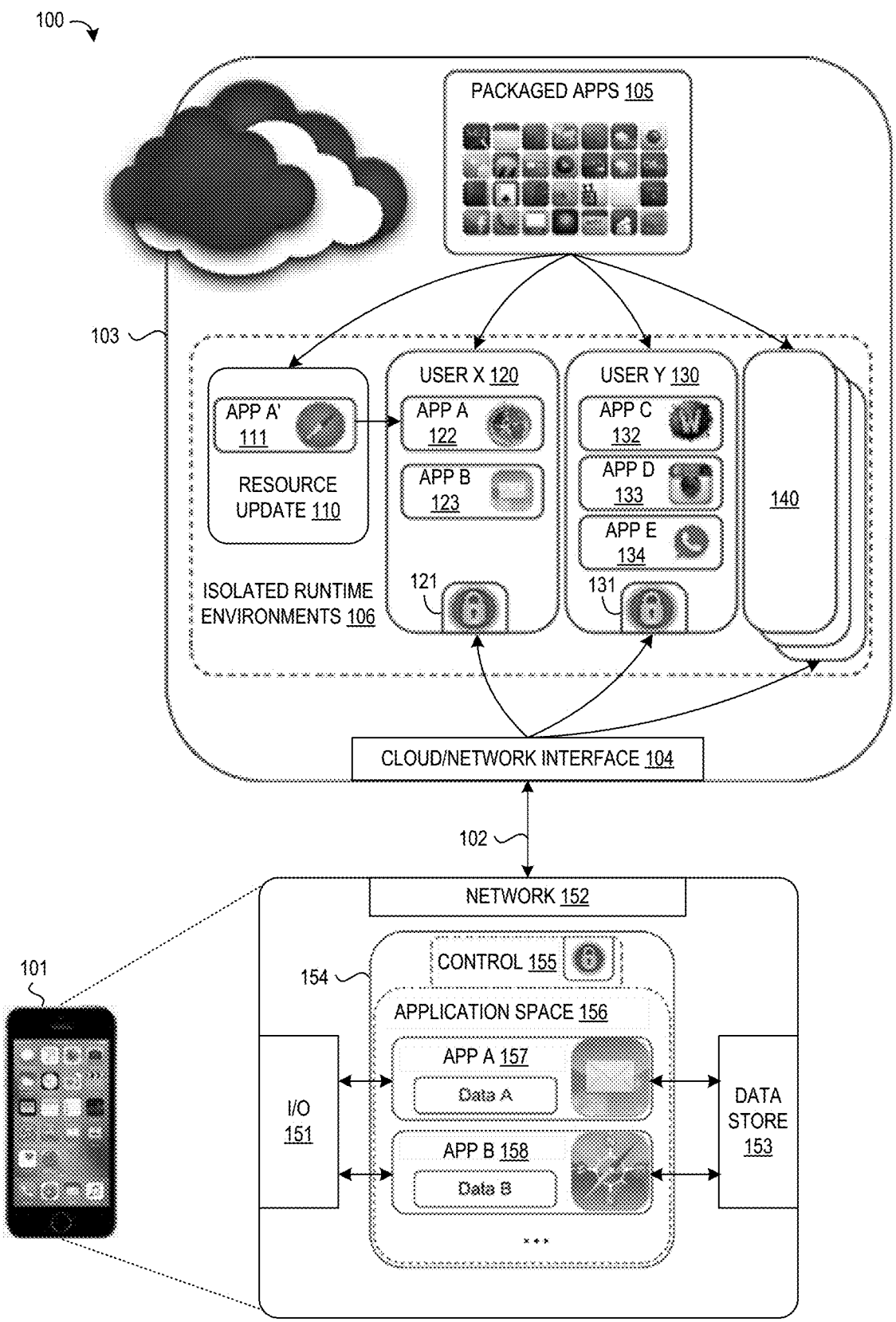
FIG. 1 depicts an example diagram of a distributed data processing system in accordance with selected embodiments of the present disclosure.

Embodiments of the present invention provide for mobile application updates by leveraging one or more cloud-based application stores which employ per-user isolated secure environments in the cloud as a safe area to securely perform application maintenance operations on mobile device applications. In selected embodiments where a cloud-based application store sends back only changed information to update a mobile device application, the computing resources and required bandwidth are reduced and the update speed is increased. In the implementation details of the various embodiments disclosed herein, one or more problems associated with maintaining applications on a mobile platform are addressed. One such problem arises with conventional approaches which require that all configuration operations happen on the mobile device. For example, with smaller screens, limited controls, and no ability to revert to known-good configurations, the configuration experience is impaired. In addition, the small size of a device, especially in the wearable category, often prevents users from conveniently configuring applications, and also limits the ability of the user to revert or "un do" a misconfigured application on a small device with limited controls that are not suitable for complex manipulations. Limited control options with small devices also limits the ability to easily select between different configurations or versions of an application being installed or updated, or to test the success of an update or change of configuration before it is applied on a device. Another problem arising with small devices relates to the resource constraints for any memory or processing operations, such as inefficient memory consumption and limitations with current approaches for creating back up and fool-proofing of the mobile systems. For example, conventional installation operations require a "scratch-space" in memory to download an archive of an application, to unpack the application, and to install the application. In addition, there can be significant resource requirements for optimizing an application that is downloaded to a device for updating, such as bytecode pre-compilation, linking, and/or optimization. Another problem with conventional application maintenance is the consumption of data bandwidth during application download when the bulk of application installation package has to be re-downloaded. There are also security-related problems with conventional application maintenance operations which do not to provide a way to efficiently make security fixes to installation and maintenance code on already-deployed devices.

Many, if not all, of these problems arise from the fact that mobile applications are typically configured on the mobile devices. Starting from installation process, on to optimization, and eventually to configuring the software to the user's preferences, all of the processes are typically performed on the personal mobile device, regardless of how small it is. While some amount of configuration and exploration of mobile applications is possible on a smartphone, wearables are much less suitable for convenient configuration. And even mobile devices do not provide any easy way to switch between different configurations and application versions.

These limitations can also impair installation processes, especially with wearable devices that install software with a download-unpack-install process which requires additional non-negligible computing power and storage space just to install the application by first uncompressing a package into a temporary space which is then effectively copied to a separate location. The additional installation requirements often prevent users from installing software on devices that are sufficiently powerful to run it, just because there would not be enough temporary storage available. While memory limitations can be addressed by temporarily offloading some data from the device and then bring it back, or by uninstalling one or more smaller applications for subsequent re-installation, this simple approach is considerably inconvenient, especially for an unsophisticated user who has no idea how much free space would be created or if the data or applications would be able to be reloaded onto the device.

The limited availability of device resources can also impair the ability to optimize an installation at a mobile device. For example, modern mobile operating systems often optimize an installation at the mobile device by pre-compiling bytecodes, detecting common classes for optimization between applications, and linking the classes accordingly. The computational resources for such optimization operations can impose a significant processor and/or memory load on a mobile device, preventing the user from doing work and reducing device battery life. While the requirements for user input during the software maintenance can be better managed with higher end devices having larger computational and memory resources and with better user input and control, the process can be frustrating or even impossible for users of lower end devices which provide limited ability for user input or control in the process. And with application updates being distributed more frequently from a central location as packed archives without much per-device customization, the user experience gets worse and worse as more frequent updates are generated, requiring user interaction through unwieldy controls on the mobile device. The increasing frequency of application updates is exacerbated by the current "best practices" in application development to promote fast iterations by constructing an application as a set of software modules (e.g., as classes, functions, or data) so that each update is likely to contain small changes to some of the modules. But since conventional installation and update practices necessitate re-downloading of the complete package and full re-installation of application, duplicate modules are re-downloaded over and over, requiring additional space for the update process. While incremental software update schemes exist, they require more processing power for the installation and are generally not used on installed software directly and have to be applied on packages. Therefore, to apply an update while saving download bandwidth, one has to keep the previous installer, patch it with the received update, and then reinstall the patched update.

The limitations with existing configuration procedures can also impair the ability of a device to be kept in working or recoverable condition after a software glitch or incorrect user action, such as deleting essential module. Protection against inadvertent user action is commonly achieved by marking applications that are deemed by the manufacturer as crucial to the device operation as read-only, but such default applications can only be updated by installing a newer copy side-by-side to the old one since replacing the original read only copy is not possible. When most of the built-in applications are updated, this could consume up to 30% of device memory, requiring memory-deficient devices to choose between installing new applications and updating built-in default applications.

Yet another challenge with performing installation and maintenance work on a mobile device is the inability to improve or fix security vulnerabilities in the installation process unless the device manufacturer provides firmware update to the device. Unfortunately, many device manufacturers do not provide updates, leaving users with suboptimal installation and maintenance processes.

To address one or more of the problems arising from the conventional approaches for configuring mobile applications on the mobile devices, there is disclosed herein a mechanism for creating a virtual representation of a mobile device in the cloud at an application center which can perform any required configuration, installation, update, and maintenance operations for mobile devices. By offloading most of the software installation, upgrade and maintenance tasks to the cloud-based application center and using an efficient update algorithm to propagate changes made on the application center to the mobile device, limited resources of mobile devices may be freed for running the applications. In selected embodiments where the mobile device offloads to the application center is all the configuration, install, update, and maintenance operations that do not require mobility, there are numerous advantages obtained. First, memory space on the mobile device is not used or wasted by the installation process, and can therefore be fully utilized by mobile device applications. In addition, a mobile device user can use a web user interface to easily configure one or more versions or configurations of an application at the application center so that only the version/configuration that is currently needed is synced to the actual mobile device, eliminating the need to fiddle with the mobile device itself. Another advantage of a cloud-based mobile application update is that computationally expensive maintenance operations, such as pre-compilation, linking, etc. can be performed on the servers of the application center, saving time battery power and disk space of the mobile device. And by providing a virtual representation of an application in the cloud-based application center, post-upgrade tests can be performed automatically to test the update/configuration for success before transferring the update/configuration to the actual device so that the original, configured state can be returned if the post-upgrade test(s) fail. This ability to detect and prevent application malfunctions from being installed is especially advantageous for smaller, low power size/low powered devices with limited interaction options (such as wearable devices) which are less suitable for executing complex manipulations, such as reverting a misconfigured application to known-good configurations on a wearable device) or performing the configuration of the wearable's application on the actual device itself, in comparison to configuring and exploring mobile applications on larger size devices such as smartphones. A cloud-based application update can also increase the update efficiency by updating only modules that are changed by an update, thereby saving bandwidth by limiting transfer to only genuinely novel byte sequences that do not exist elsewhere on the mobile device. Another advantage of cloud-based application updates is that backups can be stored at the application center server(s), reducing the need for storing write-protected applications on the mobile device. In addition, installation and update processes can be kept secure and updated for all devices automatically, as they are fully accessible on the application center.

The present invention may be an apparatus, system, method, and/or computer program product. In addition, selected aspects of the present invention may take the form of an entirely hardware embodiment, an entirely software embodiment (including firmware, resident software, microcode, etc.), or an embodiment combining software and/or hardware aspects that may all generally be referred to herein as a "circuit," "module" or "system." Furthermore, aspects of the present invention may take the form of computer program product embodied in a computer readable storage medium or media having computer readable program instructions thereon for causing a processor to carry out aspects of the present invention. Thus embodied, the disclosed system, a method, and/or a computer program product is operative to improve the functionality and operation of a data processing system by providing cloud-based management of applications to securely and efficiently install, configure, upgrade and/or back up applications on the data processing system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, unless otherwise indicated, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of a distributed data processing system, generally designated 100, in accordance with selected embodiments of the present disclosure. FIG. 1 provides only an illustration of selected implementations and does not imply any limitations with regard to the environments in which different embodiments may be implemented. Many modifications to the depicted distributed data processing system may be made by those skilled in the art without departing from the scope of the invention as recited by the claims.

Distributed data processing system 100 includes one or more client devices 101 (e.g., a mobile device) and a cloud-based server 103 (e.g., an application center), all interconnected over a network 102. The network 102 is the medium used to provide communication links between various devices and computers connected together within distributed data processing system 100, and may include, for example, a telecommunications network, a local area network (LAN), a wide area network (WAN), such as the Internet, or a combination of the three, and includes wired, wireless, and/or fiber optic connections. Network 102 includes one or more wired and/or wireless networks that are capable of receiving and transmitting data, voice, and/or video signals, including multimedia signals that include voice, data, and video information.

As shown in FIG. 1, each client device 101 may be embodied as a mobile device, such as an iPhone or Android phone, which includes one or more processors or microcontrollers and associated memory storage devices which are connected and configured to implement a mobile computing functionality, such as a communication device or a wearable device. In similar fashion, each cloud-based server 103 may include one or more processors or microcontrollers and associated memory storage devices which are connected and configured to implement a defined server computing functionality, such as an application center server. The configuring of the client device 101 and/or cloud-based server 103 may each comprise the providing of application specific hardware, firmware, or the like to facilitate the performance of the operations and generation of the outputs described herein with regard to the illustrative embodiments. In addition or in the alternative, the configuring of each client device 101 and/or cloud-based server 103 may include storing software applications in one or more storage devices and loaded into memory of a computing device, such as by the cloud-based server 103, for causing one or more hardware processors of the client device 101 and/or cloud-based server 103 to execute the software applications that configure the processor(s) to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the client device 101 and/or cloud-based server 103 is configured in one of these ways, it becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates the maintenance and updating of software applications on the client device 101 by creating a virtual representation of a mobile device in the cloud-based server 103 which may be used to offload the software configuration, installation, upgrade and maintenance tasks, freeing up the limited resources of the client device 101 for running the applications.

In accordance with selected embodiments, the overall structure of a mobile client device 101 includes an input/output interface unit 151, a network interface unit 152, a data store unit 153, and a processing unit 154. The input/output interface unit 151 is connected and configured to provide a data connection to I/O on the client device 101, such as a keyboard, a keypad, a touch screen, display screen and/or some other suitable input/output on the client device 101. In addition, the network interface unit 152 is connected and configured to provide a communication link with other data processing systems or devices, such as by providing a network interface card for exchanging data with the cloud-based server 103 via the network 102. The data store unit 153 is shown as a separate storage unit which may be separately accessed by individual applications 157, 158 running on the client device 101 using one or more APIs. As disclosed herein, the processing unit 154 includes the defined computing functionality which is implemented with software and/or hardware resources (e.g., processor(s) and memory) describe herein. In particular, the processing unit includes an application space 156 for running applications (e.g., App A 157, App B 158) within separate sandboxed lightweight virtual machines in a way that is similar to the sandbox implementations for android OS. With each application virtual machine in its own sandbox, read-only components may be efficiently shared while still being located in independent sandboxes. For example, data that can be used by several applications 157, 158 can be stored externally to the sandboxes at the data store 153 and accessed by the applications using a set of APIs for data access. By provisioning the data store 153 outside of the virtual machines for use in storing data that is not controlled by the application center (e.g., images, music, and common databases, such as contacts, sms and similar information), the process for synchronizing applications and updating operations is simplified. On the other hand, any data (e.g., Data A) that is required for operation of an application virtual machine (e.g., App A) can be included in its sandbox. The processing unit 154 may also include a control module 155 that is configured to perform updates of the application virtual machines 157, 158 by starting, stopping, and modifying the virtual machine images. As seen from the foregoing, the arrangement of applications 157, 158 to run on separate virtual machines in their own, dedicated sandbox environments means that the client device 101 no longer needs to store default or built-in system applications in read-only memory since updated and known-good versions of any application can be retrieved and downloaded from the cloud-based server 103 in a fully configured manner.

In the depicted distributed data processing system 100, the cloud-based server 103 may be implemented with one or more management servers, web servers, and/or any other electronic device or computing system capable of receiving, storing, analyzing, and sending data, including but not limited to installing, configuring, upgrading and/or backing up software application modules. As depicted, the overall structure of the cloud-based server 103 includes a cloud or network interface unit 104, a packaged application store 105, and one or more isolated runtime environment 106. The cloud or network interface unit 104 is connected and configured to provide an interface for receiving connections from users and routing encrypted data to corresponding user environments at the cloud-based server 103. The packaged application store unit 105 may be embodied as a centralized application store for storing installation file packages and/or different configurations or versions of applications running on the client device 101. To enable application update and maintenance in the cloud, the isolated runtime environment 106 includes a copy of each user's application runtime environment from the client device 101 so that the maintenance process can take the environment into the account. As depicted, each user environment consists of a set of application virtual machines for the applications installed on that user's client device. For example, the isolated runtime environment 106 may include a first application runtime environment for user X 120 with a copy of the application virtual machines App A 122, App B 123 which are installed on user X's client device 101. In addition, the isolated runtime environment 106 may include a second application runtime environment for user Y 130, and one or more additional application runtime environments for additional users 140. To update or configure any of the application VMs, a resource update unit 110 may be provided for performing an upgrade, update, optimization and/or other maintenance operation, thereby replacing the original application VM (e.g., App A 122) with an updated application VM (e.g., App A' 111).

By providing a separate sandbox for each application App A 157, App B 158 in the client device 101, each application can efficiently share read-only components while still being located in independent sandboxes. While the client-side applications App A 157, App B 158 are each shown as including data (e.g., Data A, Data B), it will be appreciated that data that is not be part of the sandbox may be stored in the data store 153, where it can be used by several applications using a set of APIs for data access. This approach makes dealing with application sync easier and simplifies update operations. Using this same format at the cloud-based server 103, duplicate per-application virtual machines App A 122, App B 123 can be stored in the isolated runtime environments 106 of the cloud-based server 103, thereby enabling all maintenance operations (e.g., configure, upgrade and installations) to be independently performed on the duplicate per-application virtual machines App A 122, App B 123 and separately synchronized as needed.

To manage the secure transfer of application update results to the client device 101, the communication control module 155 may use a private key to securely access the isolated runtime environment in the cloud-based application center 103 that corresponds to the client device 101. In addition, the corresponding application runtime environment 120, 130 at the cloud-based server 103 may include a (de)encryption unit 121, 131 which decrypts all user data being input to the user's isolated runtime environment and encrypts user data output from the user's isolated runtime environment. In this way, the communication control module 155 and (de)encryption unit 121, 131 may securely communicate over the network interface unit 152, network 102, and cloud/network interface unit 104 to provide the instructions for what operations to perform to a device's applications and then fetch a completed, ready-to use configuration update.

With sandboxed application virtual machines (e.g., 122, 123) at the cloud-based server 103 that duplicate or clone the sandboxed application virtual machines 157, 158 at the client device 101, the cloud-based server 103 provides enhanced application center functionality. In addition to handling the distribution of separate applications, the cloud-based application center server 103 is a computing provider for mobile devices which can act on the duplicate or cloned sandboxed application virtual machines 122, 123 to handle complete, installed, ready-to-use application configurations, along with a range of application maintenance operations, thereby freeing resources on the user's devices 101 for running the applications.

Such duplication or cloning is enabled to achieve smooth interoperation by designing each application virtual machine to run in its own isolated sandbox with clearly defined interfaces that are optimized for efficient cloning of the application VMs. One advantage for having cloned copies of the client application VMs on the cloud is that both the client device 101 and the cloud-based server 103 know what binary data is missing on the client side since all the client devices are connected to the cloud-based application center 103 where all installation maintenance operations are conducted. It is therefore possible for the cloud-based application center 103 to calculate the binary patch for a sandbox (e.g., code which is not available in any application on the device), and just send references for the rest of the code. In this way, the efficiency of cloning operations is increased by using any suitable algorithm for efficiently computing binary patches so the transfer of the application virtual machine image can be performed in incremental manner, without having to transfer full application image after a minor update.

Another advantage of having cloned copies of the client application VMs on the cloud-based application center 103 is that the application virtual machines running in the cloud can be controlled or configured by a user who interactively accesses the cloud-based application VMs with a user computer that connects to the cloud-based application center 103 using a convenient user interface (e.g., a browser application on a desktop or laptop computer), thereby avoiding the need to fiddle with tiny screen and limited interaction options of wearable/low power device.

Figure 2:
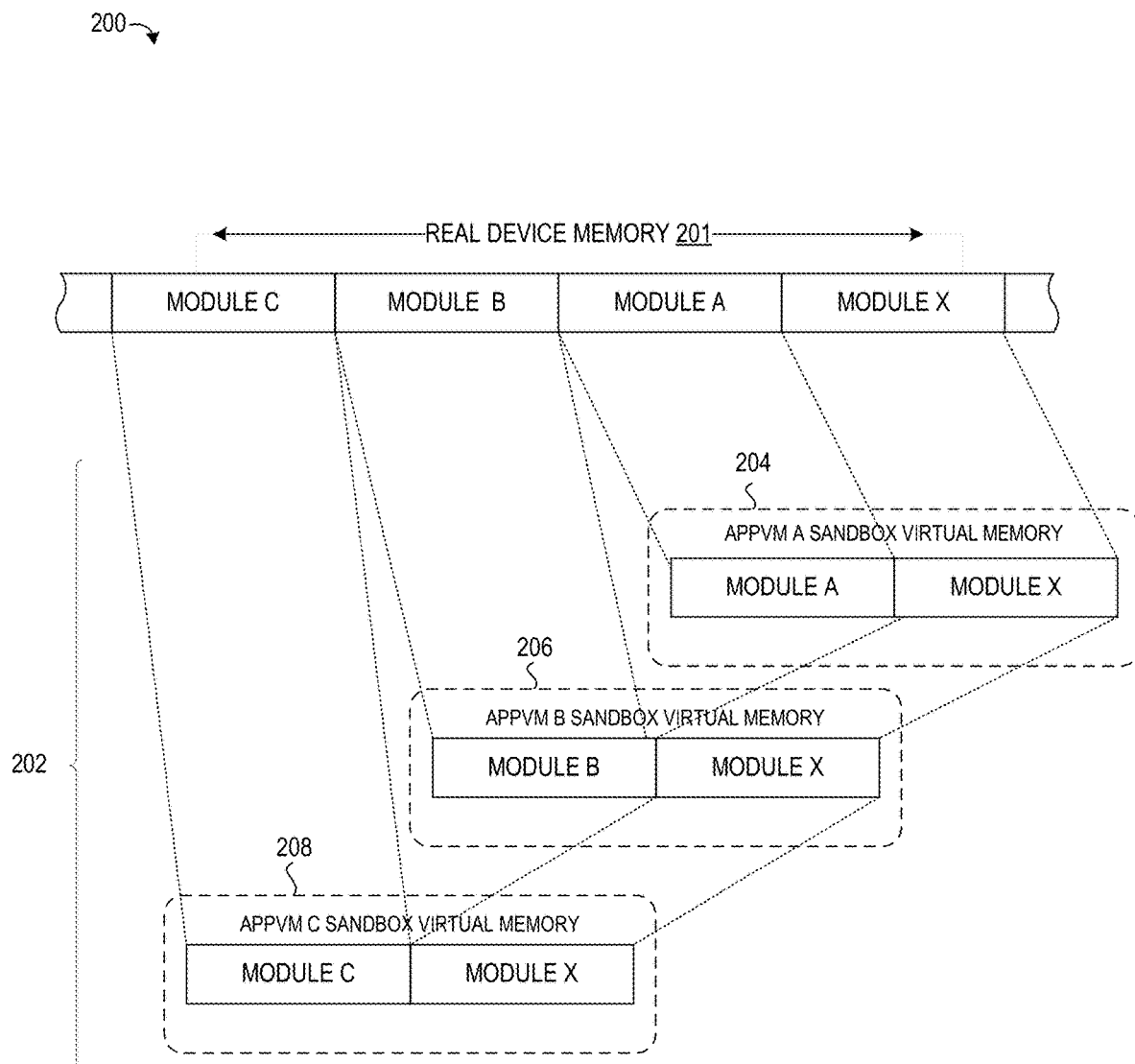
FIG. 2 is a simplified diagram illustrating an example memory layout for a plurality of modules at a mobile device in accordance with selected embodiments of the present disclosure.

To provide additional details for an improved understanding of selected embodiments of the present disclosure, reference is now made to FIG. 2 which depicts a simplified diagram illustrating an example memory layout 200 for a plurality of sandboxed applications (Application A, Application B, Application C) 202. Each application is comprised of a set of modules. If some modules, such as in this example, Module X, are used by several independent applications, they can be represented by only one copy in real memory 201, thus reducing memory requirements. To make use of common modules, they need to be detected first. This can be done on the server side, while installing the application. To make sharing of modules more efficient, it is also possible to put commonly changing data in a separate, configuration module, so that other modules remain free of configuration data and could be shared between different applications.

Figure 3:
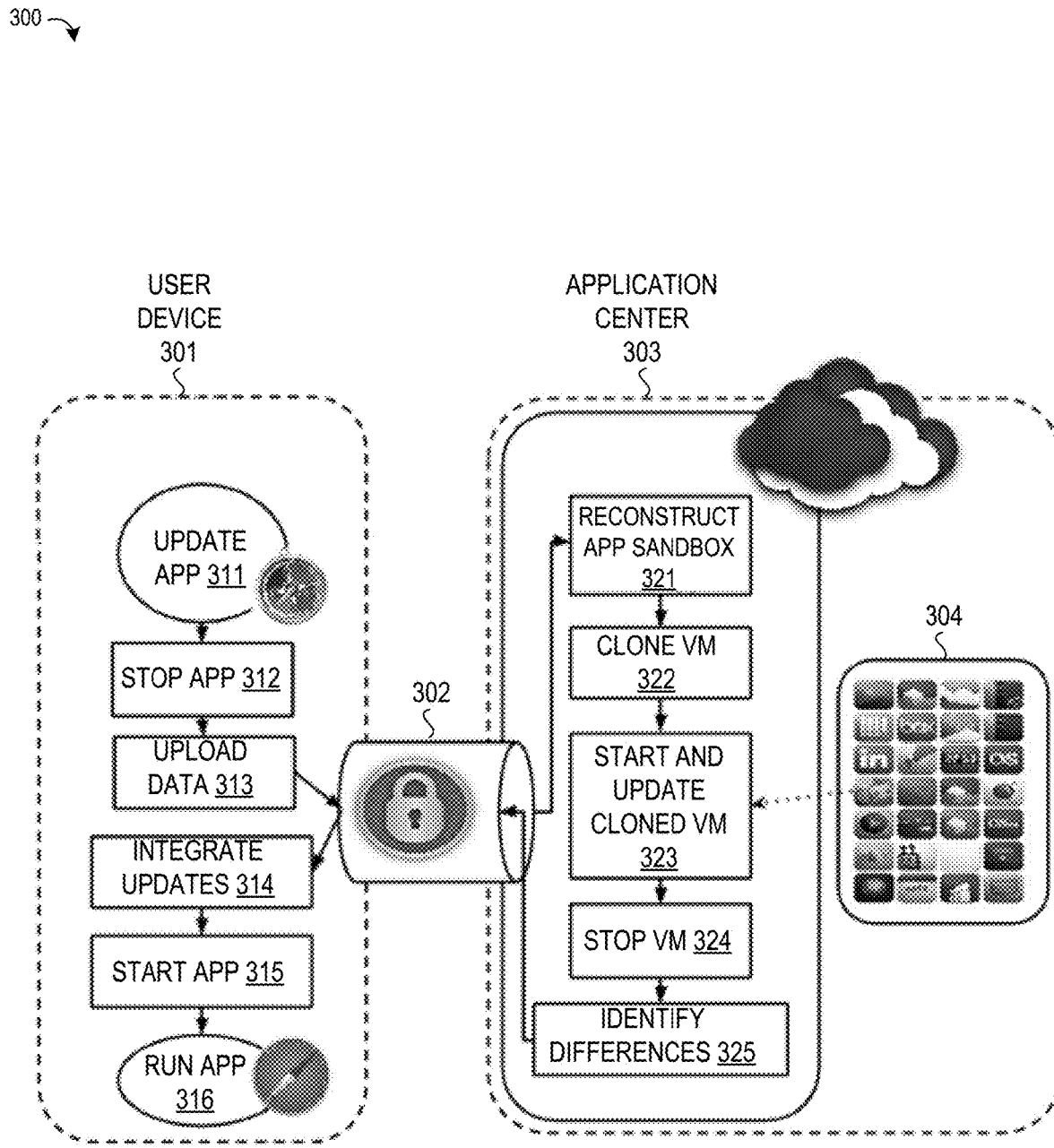
FIG. 3 illustrates a simplified flow chart showing the logic for performing cloud-based maintenance of a software application in accordance with selected embodiments of the present disclosure.

To provide additional details for an improved understanding of selected embodiments of the present disclosure, reference is now made to FIG. 3 which depicts a simplified flow chart 300 showing the logic for performing cloud-based maintenance of a software application in accordance with selected embodiments of the present disclosure. The processing shown in FIG. 3 may be performed by a first user device computing system 301 and application center computing system 303 as indicated. As shown in FIG. 3, the operation starts when an application update is required (step 311). This can occur when the user decides to update an application, or when an update notification is received by the user, or on a predetermined update event or schedule.

Once an application update is initiated, the corresponding application is stopped or suspended from further activity (step 312) at the user device 301. As disclosed with reference to the distributed data processing system shown in FIG. 1, the application virtual machine may be stopped by the control module 155 which issues an instruction to pause the virtual machine running the application being updated at the client device 100.

Once the application is paused or stopped, data is uploaded to the application center (step 313) which identifies which, if any, modules have been changed or modified during operation of the application. As disclosed with reference to the distributed data processing system shown in FIG. 1, the communication control module 155 may analyze and/or track the state of the application VM being updated to detect any changed modules in the application being updated. To reduce the amount of data being uploaded, only the modified modules for the application VM are uploaded. In selected embodiments, the data upload step 313 may use an encrypted or otherwise secured communication channel 302 that links the first user device computing system 301 and application center computing system 303, such as by employing (de)encryption units.

At the application center 303, the uploaded data or modules are used to reconstruct an application sandbox corresponding to the application being updated (step 321), thereby constructing an image of the user device 101 (e.g., phone) at the application center 303. As disclosed with reference to the distributed data processing system shown in FIG. 1, the resource update unit 110 may reconstruct the client-side application VM sandbox at the application center 303 by using the uploaded data/modules to identify and retrieve the remaining or unmodified modules for the application VM being updated using a list of known modules and applications from an application store 304, thus obtaining a cloned sandbox (step 322) that is identical to the application sandbox on the client device 100. Further, modules of packaged apps 105 can be used to perform required operations in isolated runtime environments 106.

Though the application structure at the user device 301 and application center 303 preferably separates the application functionality into one or more sandboxed instruction modules and an external data structure that is accessed from outside the sandbox with data APIs, some applications may opt to store the data inside the sandboxed module. In such embodiments, the large size of the data-containing modules can defeat the purpose of bandwidth optimization as they will consume more data in uploading the module to the application center 303. To address this issue, such data-containing modules can be marked for special treatment in which the size of such data-containing modules (and not the module itself) is transferred to the application center 303. While not 100% complete, this approach can still be used to perform updates and retrieve the updated code, and in the (unlikely) eventuality that the update process requires access to the un-transferred data, such access can cause a page fault, causing the missing data to be uploaded from the client and the update proceeding as normal.

With the identical sandbox reconstructed, the application center 303 starts the application VM and performs the required upgrade, update, optimization, or other configuration processing (step 323). Since the update processing is performed using the resources of the application center 303, the client-side computing resources, memory and communication link bandwidth are conserved and available for use to run applications. As disclosed with reference to the distributed data processing system shown in FIG. 1, the resource update unit 110 may use its computational resources to perform the requested maintenance operations to add, remove, update, or otherwise configure module components, and also to keep track of which modules in the cloned sandbox are modified during the update operations. For applications running on resource constrained user devices, such as wearables and low end devices, the application center 303 may temporarily add or access capacity, such as extra ram and scratch disk space, when starting the cloned virtual machine so that the update process could quickly and successfully complete. The ability to access memory capacity at the application center 303 allows a user to access one or more configured application VMs at the application center 303 that would not otherwise fit on the user device 101. Thus, the expanded storage capacity at the application center 303 allows the user to select which applications are needed to update or change the device functionality at the user device 301 without reinstalling/losing configuration of the applications stored at the application center 303.

Once the application update is completed, the cloned application virtual machine is stopped (step 324) at the application center 303. At this point, the modules that were changed during the update or configuration process may be identified (step 325), such as by calculating the differences between the original application VM and updated application n VM. As disclosed with reference to the distributed data processing system shown in FIG. 1, the resource update unit 110 may identify the differences in terms of the modules that were changed by the update process.

In addition to storing the identified modules in the application store 304 for subsequent use, the identified differences or other update information may be sent to the user device 301. As disclosed with reference to the distributed data processing system shown in FIG. 1, the identified differences are sent back to the user device 101 as information which identifies the changed modules and layout. In selected embodiments, this information is securely downloaded by using the encryption unit 121 may encrypt or otherwise securely send the identified differences over the communication channel 302 to the user device 301.

Once received at the user device 101, the identified differences or updates are integrated in the sandbox of the stopped application (step 314). As disclosed with reference to the distributed data processing system shown in FIG. 1, the communication control module 155 may apply the identified differences or changed modules to the stopped application VM by integrating the changed modules as updates in the sandbox of the stopped application VM. With the user device configuration of application VMs being controlled by the communication control module 155, the user device 101 no longer requires that built-in default applications be stored in read only memory since they can be re-downloaded from application virtual machine images from the application center 303 which keeps snapshots of the known-good configurations, providing an easy way to revert a misconfigured application to a normal working condition. Once the application VM is restarted (step 315), the updated application is running and operational (step 316).

Figure 4:
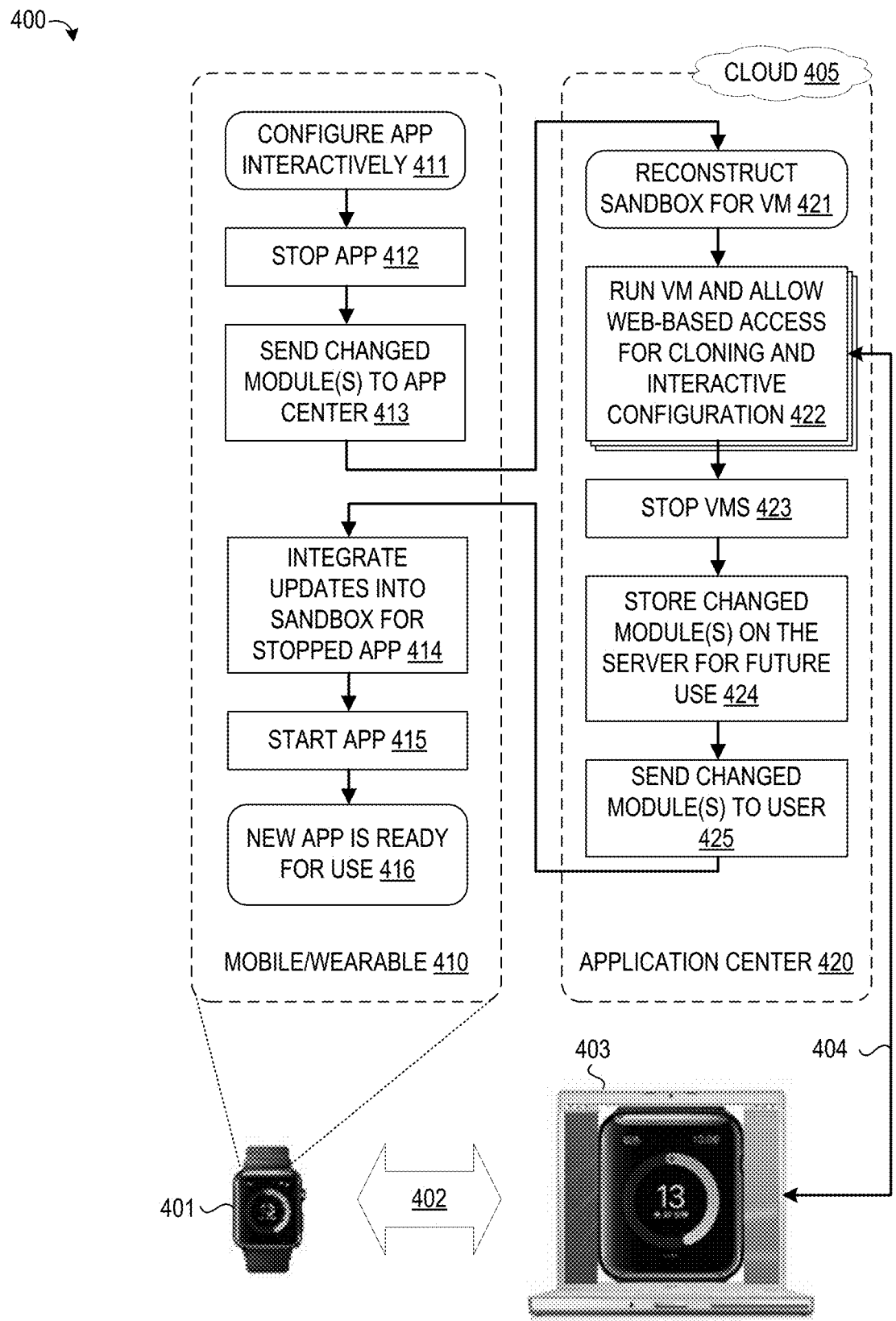
FIG. 4 illustrates a simplified flow chart showing the logic for performing cloud-based interactive maintenance of a software application in accordance with selected embodiments of the present disclosure.

An additional benefit of running application virtual machines at the application center is the possibility of using the application center to provide a venue for configuration operations for a user who which might otherwise have limited configuration controls at the user device, such as a wearable or other low end device. To illustrate selected embodiments for using the application center to provide interactive maintenance controls, reference is now made to FIG. 4 which illustrates a simplified flow chart 400 showing the logic for performing cloud-based interactive maintenance of a software application at a first user device 401 by using configuration input controls at a second user device 403 to provide interactive configuration input 402 via the application center 420 which may be located in the cloud 405. As will be appreciated, the processing shown in FIG. 4 may be performed by a first user device computing system 410 (such as a mobile phone or wearable device 401), second user device computing system 402 (such as a main computer), and an application center computing system 420 as indicated.

Similar to the processing steps shown in FIG. 3, the operation starts when an interactive application configuration or update occurs at the user's request (step 411), at which point the corresponding application VM is stopped or suspended from further activity (step 412) at the wearable user device 410. Once the application is paused or stopped, data is uploaded to the application center (step 413), such as by sending the application center 420 any modules that have been changed or modified during operation of the application being updated or configured. Though not shown, it will be appreciated that the data upload step 413 may use an encrypted or otherwise secured communication channel to communicate with the application center computing system 420.

At the application center 420, the uploaded data or modules are used to reconstruct an application sandbox corresponding to the application being updated (step 421), thereby constructing an image of the application being updated or configured at the application center 420. Using the uploaded changed modules, the application center 420 may identify and retrieve the remaining or unmodified modules for the application VM being updated using a list of known modules and applications from an application store, thus obtaining a cloned sandbox that is identical to the application sandbox on the wearable user device 410.

With the identical sandbox reconstructed, the application center 420 starts the application VM and performs the interactive upgrade, update, optimization, or other configuration processing (step 422). To provide interactive input from the user, processing at step 422 may include a user interface that can be exposed to the user with a configuration browser running on the second user device 403 to provide additional configuration input operations 404. In selected embodiments, this provides web-based access for interactive user input in the cloning and configuration operations on the application VM being updated or configured. By providing interactive configuration inputs during update processing at the application center 420, the client-side computing resources, memory and communication link bandwidth are conserved and available for use to run applications, and the user can employ his main computer as the second user device 403 when performing configuration and tune-up of the wearable user device 410 directly from the familiar convenience of his main computer. As disclosed with reference to the distributed data processing system shown in FIG. 1, the resource update unit 110 may use its computational resources to perform the interactive maintenance operations to add, remove, update, or otherwise configure module components, and also to keep track of which modules in the cloned sandbox are modified during the update operations. The ability to access additional computational resources and memory capacity at the application center 420 allows a user to access one or more configured application VMs at the application center 420 that would not otherwise fit on the wearable user device 401, and also allows the user to select which applications are needed to update or change the device functionality at the user device 401 without reinstalling/losing configuration of the applications stored at the application center 420.

Once the application update is completed, the cloned application virtual machine is stopped (step 423) at the application center 420, and the modules that were changed during the interactive update or configuration process may be identified and stored at the server for future use (step 424), and the identified differences or other update information may be sent to the user device 410 (at step 425). In selected embodiments, the communication channel between the mobile/wearable device 410 and the application center 420 transmits only the updated modules. Though not shown, this information may be securely downloaded using any suitable encryption technology.

Once received at the wearable user device 410, the identified differences or updates are integrated in the sandbox of the stopped application (step 414). As disclosed with reference to the distributed data processing system shown in FIG. 1, the communication control module 155 may check the updated blocks or modules to see where they should be located in memory, and then assembles the complete image based on the modules transmitted. Once the transfer process is complete, the updated application virtual machine can be started up normally (step 415) to run in an operational state right away without any installation steps (step 416).

As disclosed herein, the proposed shift of maintenance tasks from a mobile device to the application center allows for full utilization of the computational capacity of mobile devices for running applications while exploiting the larger computational capacity of the application center to perform the maintenance tasks. In this arrangement, the time required to update an application is significantly reduced, as now all the server-side computational power is available for the task. After an application is updated, the cloud-based resources can be used to run tests on the updated application to make sure the application is functional. This is not possible when update is done on the mobile device itself due to limited computing resources and absence of roll-back functionality. If an update would fail on the device itself, it might have rendered the application unusable. The use of the computing resources at the cloud-based application center also reduce the problem of bandwidth consumption, as it becomes possible to analyze already-installed data on the application center side and only transfer the changed parts by comparing before- and after-application VM images. In addition, the application center can retain the previous versions of application images, making it very easy to return to a known-good state, hereby negating the requirement to have core built-in applications. Further, it becomes possible to prepare sets of applications to be quickly loaded to the phone as needed, so that the phone can be instantly re-targeted from office to home to travel use. Finally, having complete application running in the cloud allows a mobile device user to access the update/configuration process from the user's main computer, enabling the user to make changes, updates, tweaks and configuration immediately, without having to use cumbersome keyboard and controls of the wearable device itself. As a result, the mobile device user is able to test all kinds of configurations and versions at the application, with the convenience of easy interaction with web, as well as ability to go back to a known-good configuration.

When implemented to update mobile applications in the cloud, there is an increase in the memory space at the mobile device that is available for applications on the mobile device. In addition, battery life is improved as resource consuming update operations are done on server and less power is required to upload and download changed modules. Having virtual applications in the application center also allows the user to mix and match already-installed application sets suitable for different purposes and workflows, and easily switch such sets in and out of the device as required. For example, it may be desirable to use a prior version of an application at certain times for compatibility or usability reasons, and to use a later version at other times. By having virtual applications installed in the application center, the user can freely choose what version of the application to install and use on the mobile device. Finally, by having the application run directly in the application center, the user can control and configure them manually by seeing actual running applications directly in their browser, and changing configuration as needed.

In keeping with the enumerate benefits and advantages noted herein for providing cloud-based application updates, there are a variety of beneficial applications to the disclosed method and system for managing portable device applications on the central server, including the ability to change application versions without performing a direct update on the portable device. And by separating the client's data from the application modules by abstracting data access through dedicated data retrieval API's, the cloud-based remote management of application update operations can happen without requiring the knowledge (or transfer) of the user's data, thereby facilitating the incremental update and virtual configuration of portable device applications.

There are also application continuity uses of the cloud-based update mechanisms disclosed herein. For example, a mobile device, upon detecting proximity to another device or specified location, can use the cloud-based application center to prepare an application VM to be used at a second device (e.g., the user's home computer), either by making a copy on that device, or allowing remote access to the application running in the cloud. With this application continuity, a user may start working on a mobile phone on the train on the way home, and by the time the user reaches home, the application on the user's home computer is updated to match what the user was doing on the phone so that the user can continue working uninterrupted on the home computer.

The cloud-based update mechanisms can also provide enhanced security and code instrumentation for applications whereby, a mobile device, upon detecting proximity of the mobile device to a security restricted area, can use the cloud-based application center to prepare an upgraded application VM to add code verification and instrumentation functionality to the application so that the user can only access the application in protected environments by meeting the enhanced security and/or verification requirements. In such applications, the code of the mobile device software could be analyzed and changed automatically to include additional security features needed for operating in high-security environments by using a cloud-based update virtual machine to add security to the application VM and send the secured version back to the device without uninstalling the unsecured application and then reinstalling the secured application. In addition or in the alternative, an insecure application can be offloaded to the cloud before entering a high-security environment. After the user leaves the environment, the application can be restored back to his device from the cloud in exactly the same state as it was before offloading.

Another use of the cloud-based update mechanisms disclosed herein is to select the configurations that are needed on the mobile device and/or application center based on the automated detection of the mobile device location, the user's calendar, or other contextual information or patterns of usage for the user. For example, the cloud-based application center can use detected usage patterns, location data, and/or calendar information to predict which applications are likely to be used on the mobile device and then offload other applications, freeing up resources at the mobile device for improved performance. In addition to transferring software modules to the cloud, the user's data may also be transferred to the cloud if needed to release resources at the mobile device. In such scenarios, the user data can be selectively internalized into application image based on usage patterns and location, thereby limiting the amount of data that is transferred and synced. In selected embodiments, the distinction between the data that the user wants to be shared through the cloud and the data that the user wants to keep on his device locally may be selected according to the user needs (e.g., by using the interactive user configuration interface) so that only data shared through the cloud will be included into cloud based virtual environments.

As noted above, the mechanisms of the illustrative embodiments utilize specifically configured computing devices, or data processing systems, to provide cloud-based software maintenance for applications on a client device. These computing devices, or data processing systems, may comprise various hardware elements which are specifically configured, either through hardware configuration, software configuration, or a combination of hardware and software configuration, to implement one or more of the systems/subsystems described herein. For example, selected embodiments of the present disclosure can be implemented in whole or in part with different types of information handling systems that can range from small handheld devices, such as a wearable or mobile device to large mainframe systems, such as mainframe computer.

Figure 5:
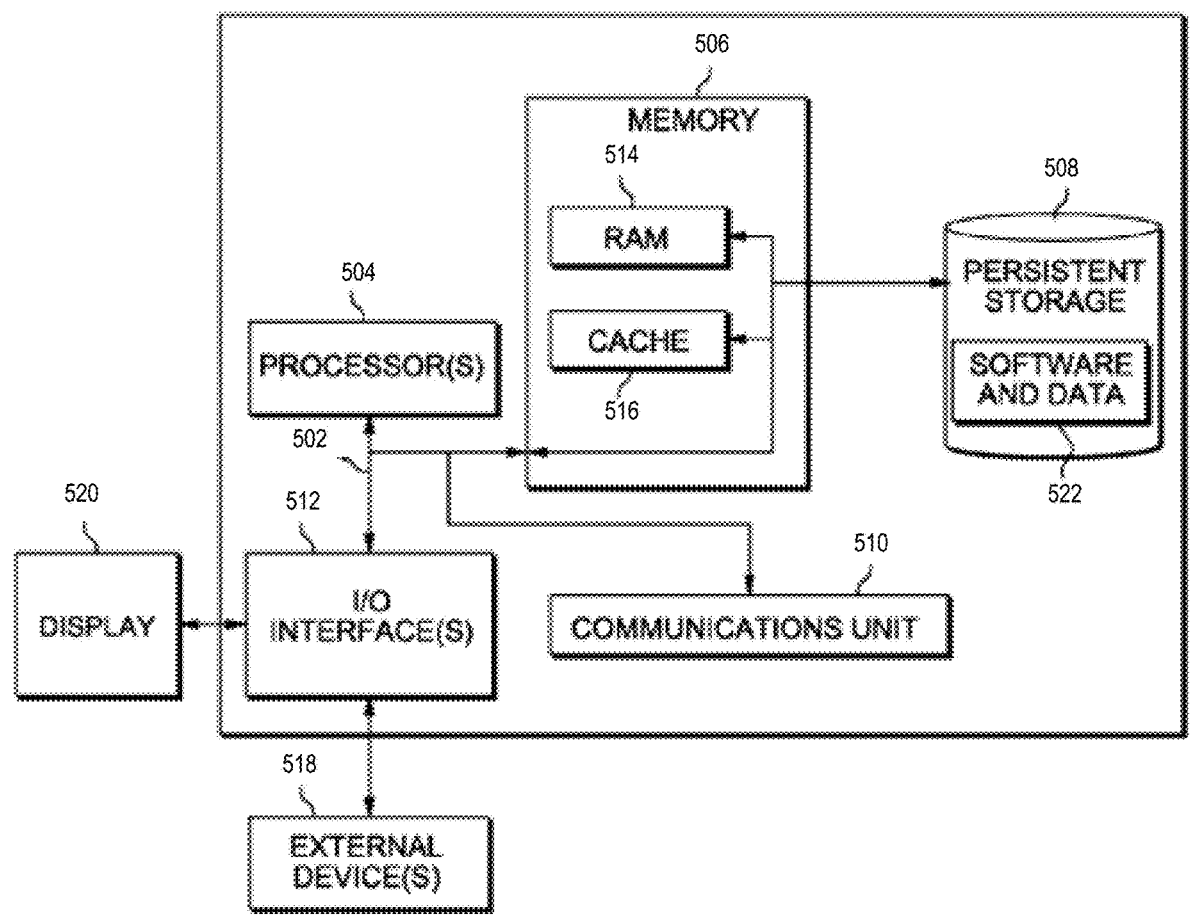
FIG. 5 illustrates a block diagram of components of an information handling system which may be used to implement selected embodiments of the present disclosure.

Examples of such information handling systems are illustrated in FIG. 5 which shows a block diagram of components of an information handling system which may be used to implement selected embodiments of the client devices 101, 301, 410 (e.g., a mobile or wearable device), a cloud-based server 103, 303, 420 (e.g., an application center), and main computer 403 in accordance with an illustrative embodiment of the present disclosure. It should be appreciated that FIG. 5 provides only an illustration of selected embodiments and does not imply any limitations with regard to the environments in which different embodiments may be implemented. Many modifications to the depicted environment may be made.

Computer 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications, and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media. Software and data 522 may be stored in persistent storage 508 for access and/or execution by processor(s) 504 via one or more memories of memory 506.

In selected embodiments, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information. The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Software and data 522 may be downloaded to persistent storage 508 through communications unit 510.

I/O interface(s) 512 allows for input and output of data with other devices that may be connected to computer 500. For example, I/O interface(s) 512 may provide a connection to external device(s) 518, such as a keyboard, a keypad, a touch screen, and/or some other suitable input device. External device(s) 518 can also include portable computer readable storage media such as, for example, thumb drives, portable optical or magnetic disks, and memory cards. Software and data 522 can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By now, it will be appreciated that there is disclosed herein a system, method, apparatus, and computer program product for updating mobile device applications at one or more central servers having a processor and a memory. As disclosed, the central server(s) may be embodied as a cloud-based application center to establish an application virtual machine representation of a first mobile device application installed on a mobile device. The first mobile device application and the application virtual machine representation of the first mobile device application may each comprise one or more software modules and separate data modules which may be accessed through a set of APIs for data access. In selected embodiments, a virtual machine implementation of the first mobile device application on the mobile device is suspended before establishing the application virtual machine representation of the first mobile device application. When establishing the application virtual machine representation, the central server(s) may construct an isolated sandbox for running the application virtual machine representation of the first mobile device application. In other embodiments, the central server(s) may establish the application virtual machine representation by receiving one or more first modules that were changed during operation of the first mobile device application installed on the mobile device since a previous update was performed, and then constructing an isolated sandbox for running the application virtual machine representation of the first mobile device application by combining one or more second modules from an application store with the one or more first modules to form the application virtual machine representation of the first mobile device application. In addition, the central server(s) may update the application virtual machine representation to perform software configuration, installation, upgrade, optimization, testing, or maintenance tasks on the application virtual machine representation without using computational resources at the mobile device. In selected embodiments, the process of updating the application virtual machine representation may include receiving user configuration input through a browser based configuration input at a computing device connected to the one or more central servers. Once the update is completed, the central server(s) send the mobile device one or more modules that were changed when updating the application virtual machine representation for integration into the first mobile device application installed on the mobile device. In selected embodiments, the modules may sent by downloading any modules that were changed when updating the application virtual machine representation for integration into the first mobile device application installed on the mobile device to change a version of the first mobile device application without performing a direct update of the entire first mobile device application on the mobile device.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of updating mobile device applications at one or more central servers, comprising:

establishing, at the one or more central servers comprising a processor and a memory, an application virtual machine representation of a first mobile device application installed on a mobile device;

updating the application virtual machine representation at the one or more central servers to perform software configuration, installation, upgrade, optimization, testing, or maintenance tasks on the application virtual machine representation without using computational resources at the mobile device; and sending, to the mobile device that, one or more modules that were changed when updating the application virtual machine representation for integration into the first mobile device application installed on the mobile device.

2. The method of claim 1, further comprising suspending a virtual machine implementation of the first mobile device application on the mobile device before establishing the application virtual machine representation of the first mobile device application.

3. The method of claim 1, where establishing the application virtual machine representation comprises constructing, at the one or more central servers, an isolated sandbox for running the application virtual machine representation of the first mobile device application.

4. The method of claim 1, where establishing the application virtual machine representation comprises receiving, at the one or more central servers, one or more first modules that were changed during operation of the first mobile device application installed on the mobile device since a previous update was performed.

5. The method of claim 4, where establishing the application virtual machine representation comprises constructing, at the one or more central servers, an isolated sandbox for running the application virtual machine representation of the first mobile device application by combining one or more second modules from an application store with the one or more first modules to form the application virtual machine representation of the first mobile device application.

6. The method of claim 1, where the one or more central servers comprise a cloud-based application center.

7. The method of claim 1, where sending one or more modules comprises downloading one or more modules that were changed when updating the application virtual machine representation for integration into the first mobile device application installed on the mobile device to change a version of the first mobile device application without performing a direct update of the entire first mobile device application on the mobile device.

8. The method of claim 1, where the first mobile device application and the application virtual machine representation of the first mobile device application each comprise one or more software modules and separate data modules which may be accessed through a set of APIs for data access.

9. The method of claim 1, where updating the application virtual machine representation comprises receiving user configuration input through a browser based configuration input at a computing device connected to the one or more central servers.

* * * * *